(No Model.) 6 Sheets—Sheet 1.
J. CONNELL.
BAND RESAWING MACHINE.
No. 590,209. Patented Sept. 21, 1897.
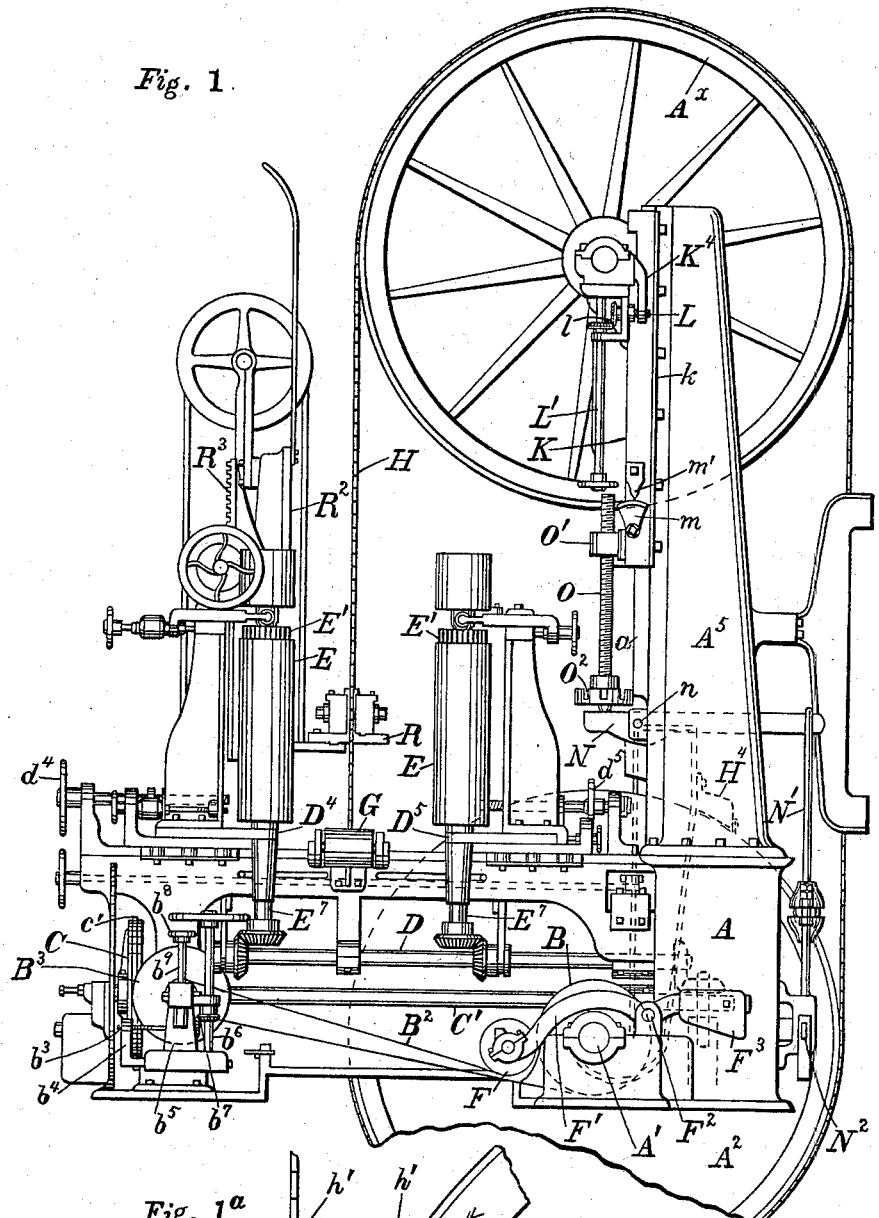
Fig. 1.
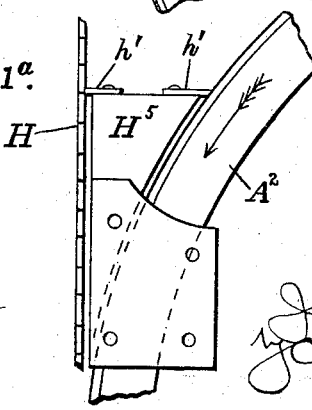
Fig. 1ª.
Witnesses
C. E. Eaton
Thomas Durant
Inventor.
John Connell
by Church & Church
his attys (No Model.) 6 Sheets—Sheet 2.

J. CONNELL.
BAND RESAWING MACHINE.

No. 590,209. Patented Sept. 21, 1897.

(No Model.)  6 Sheets—Sheet 3.

J. CONNELL.
BAND RESAWING MACHINE.

No. 590,209.  Patented Sept. 21, 1897.

*Fig.* 3.

(No Model.) 6 Sheets—Sheet 5.

J. CONNELL.
BAND RESAWING MACHINE.

No. 590,209. Patented Sept. 21, 1897.

Witnesses
D. E. Eaton
Thomas Durant

Inventor
John Connell
by Church & Church
his attys (No Model.) 6 Sheets—Sheet 6.

J. CONNELL.
BAND RESAWING MACHINE.

No. 590,209. Patented Sept. 21, 1897.

Witnesses
D. E. Eaton
Thomas Durant

Inventor
John Connell
by Church & Church
his Attorneys

UNITED STATES PATENT OFFICE.

JOHN CONNELL, OF ROCHESTER, NEW YORK.

BAND RESAWING-MACHINE.

SPECIFICATION forming part of Letters Patent No. 590,209, dated September 21, 1897.

Application filed July 9, 1895. Serial No. 555,431. (No model.)

*To all whom it may concern:*

Be it known that I, JOHN CONNELL, of Rochester, in the county of Monroe and State of New York, have invented certain new and useful Improvements in Band Resawing-Machines; and I do hereby declare the following to be a full, clear, and exact description of the same, reference being had to the accompanying drawings, forming a part of this specification, and to the reference-letters marked thereon.

My present invention relates to band resawing-machines particularly adapted for resawing boards, &c.; and it has for its object to improve the construction and operation of the various parts of such machines, whereby the band-saw may be properly guided and supported and the various adjustments required may be carried out by simple and effective means; and it also consists in certain constructions of the parts, all as will be hereinafter fully described and the novel features pointed out in the claims at the end of this specification.

Figure 2:
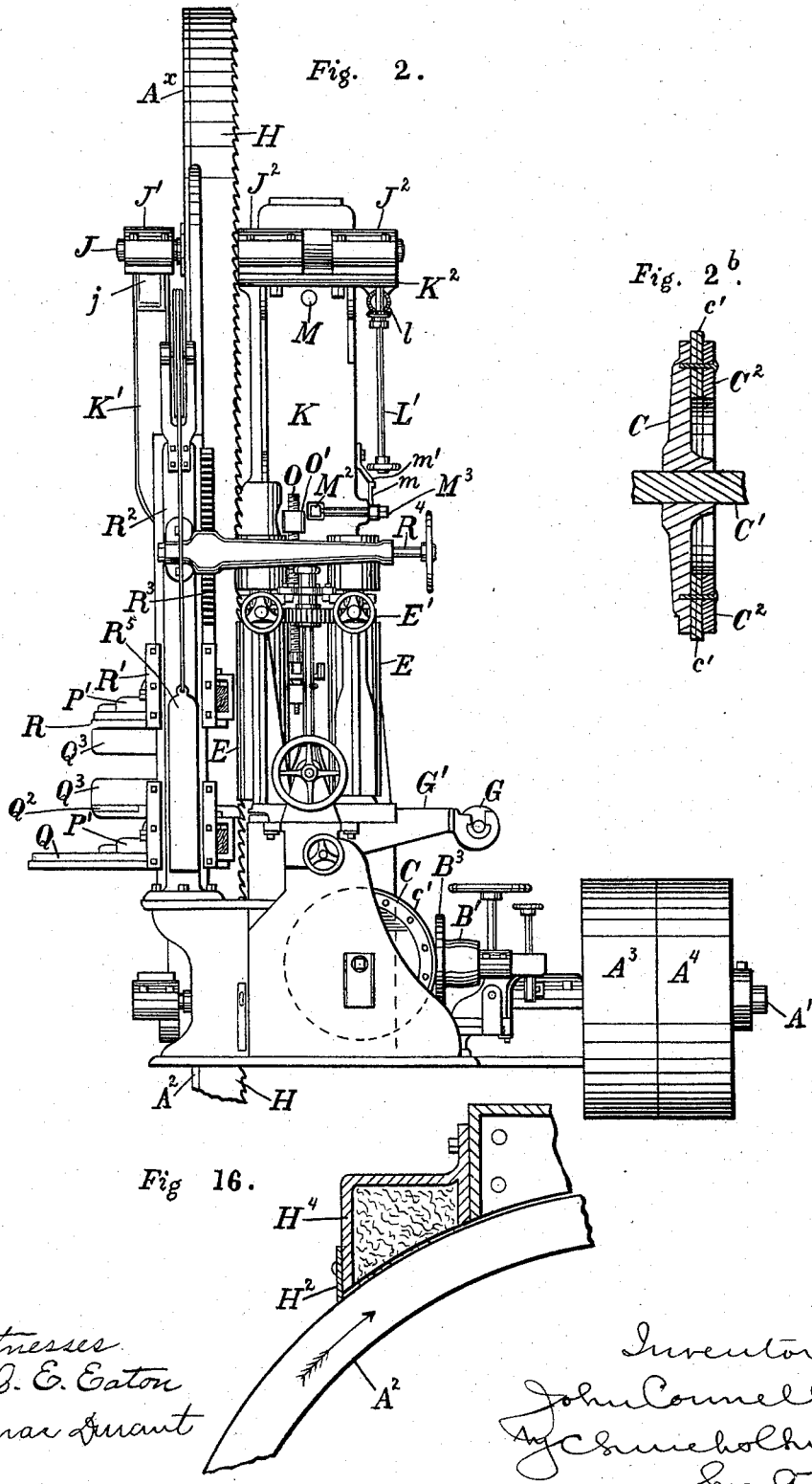
Figure 3:
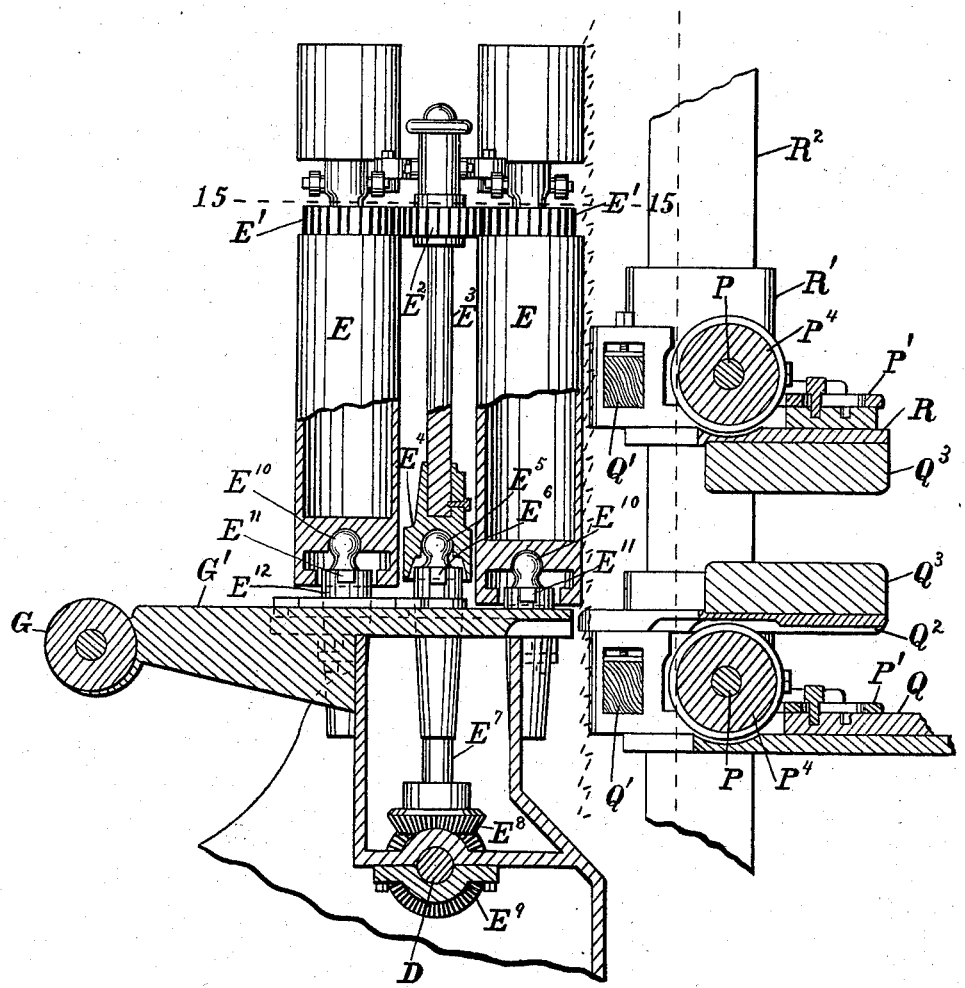
Figure 4:
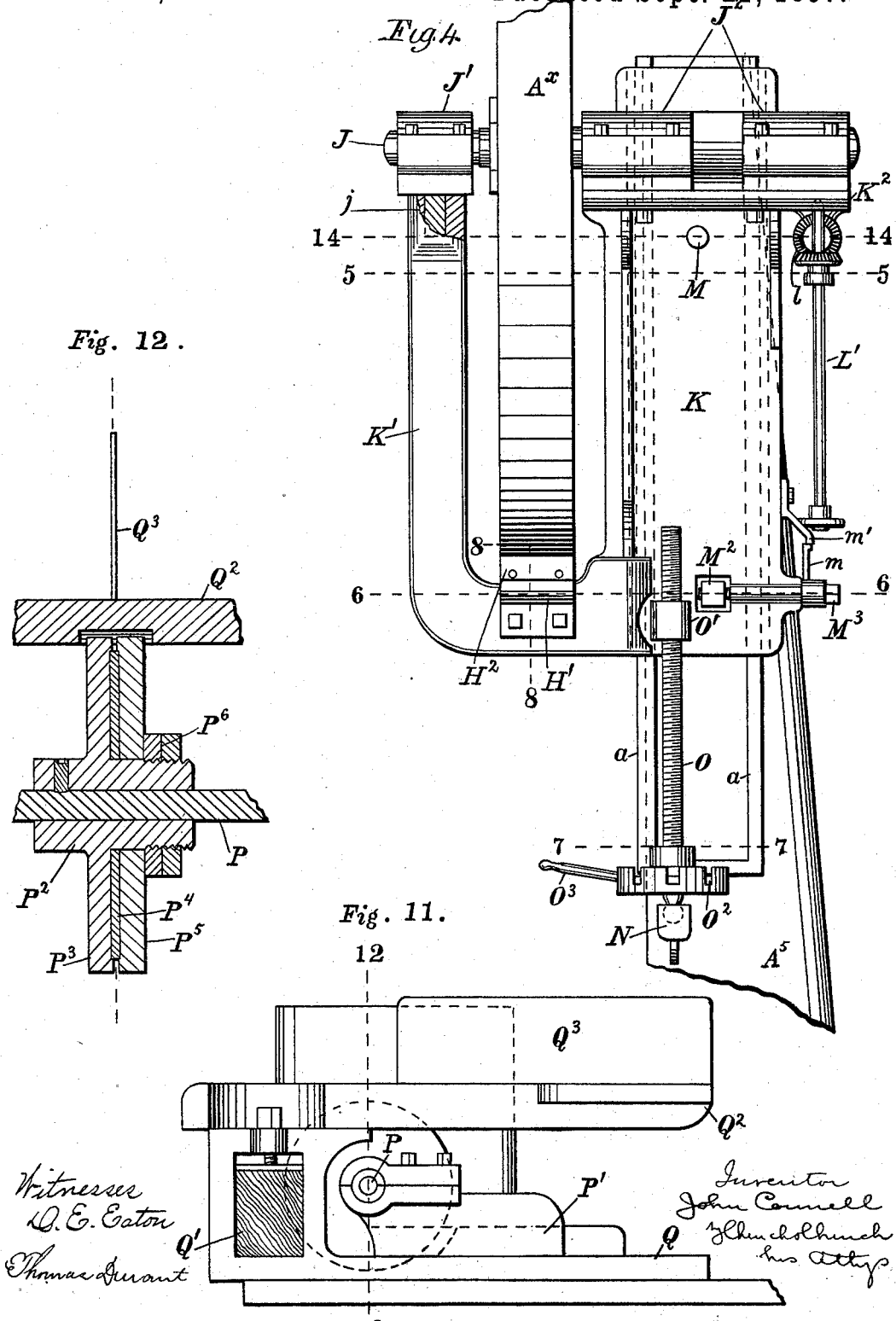
Figure 5:
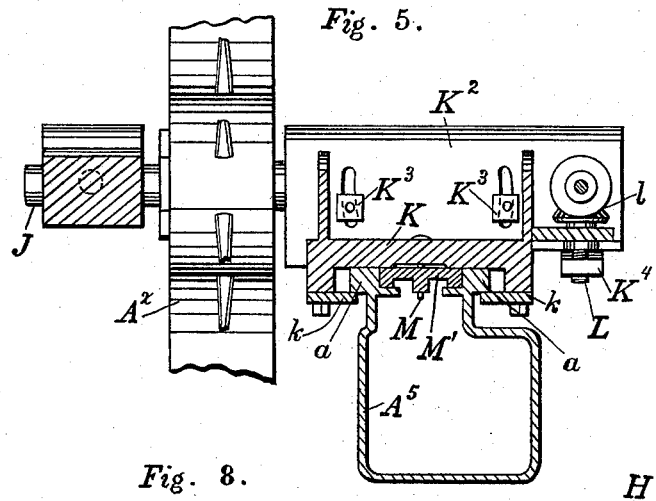
Figure 7:
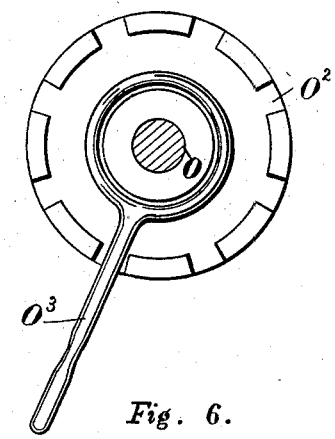
Figure 8:
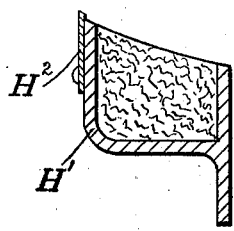
Figure 6:
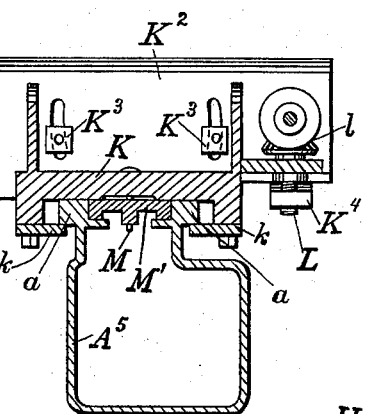
Figure 9:
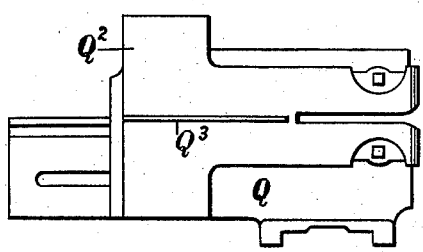
Figure 10:
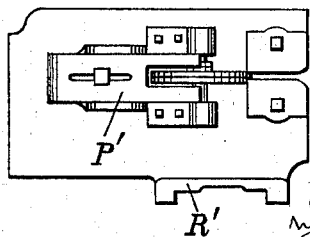
Figure 13:
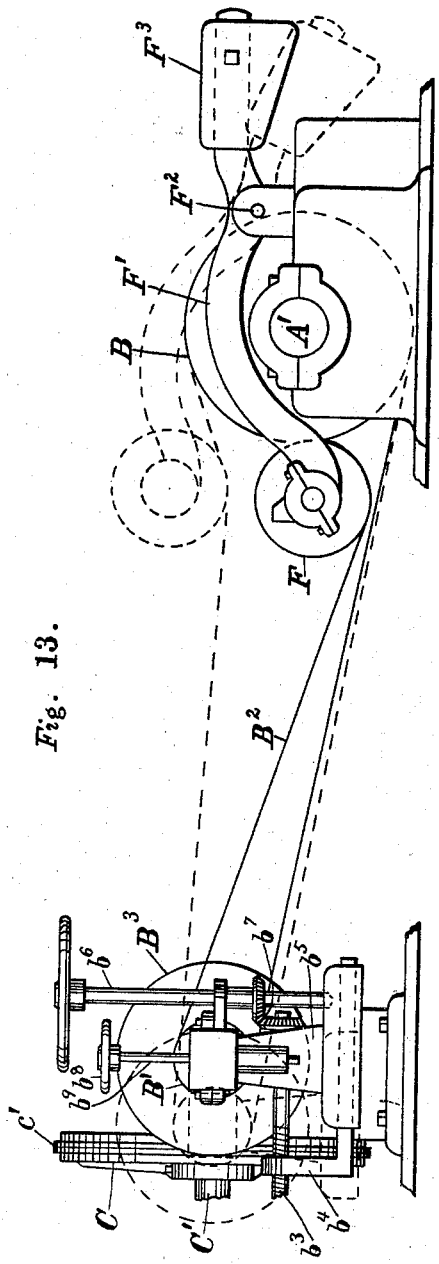
Figure 15:
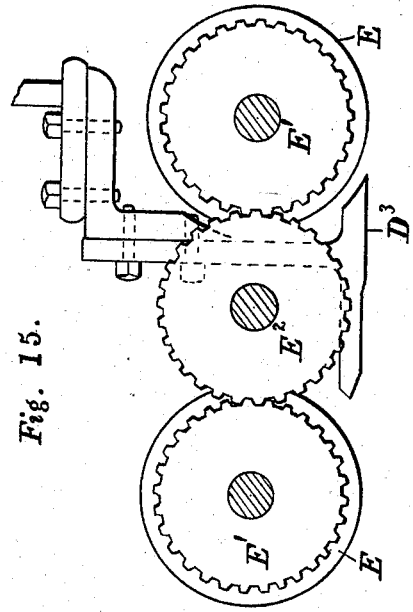
Figure 14:
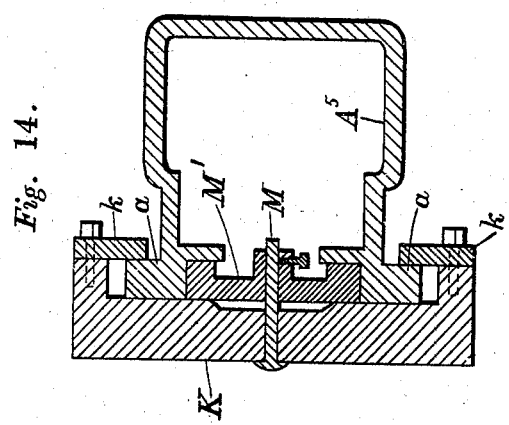

In the accompanying drawings, Figure 1 is a front elevation of a resawing-machine constructed in accordance with my invention. Fig. 1ª is a detail view showing the block arranged beneath the board-supporting rollers for preventing accumulations between the saw and its lower pulley; Fig. 2, a side view of the machine; Fig. 2ᵇ, a view of a detail; Fig. 3, a vertical sectional view taken on the line of the saw in Fig. 1; Fig. 4, an enlarged front elevation of the upper saw-pulley; Fig. 5, a sectional view of the same, taken on the line 5 5 of Fig. 4; Fig. 6, a similar view taken on the line 6 6 of Fig. 4; Fig. 7, a sectional view on the line 7 7 of Fig. 4; Fig. 8, a sectional view of the upper-pulley oil-box and scraper, taken on the line 8 8 of Fig. 4; Fig. 9, a plan view of the lower saw-guiding block and kerf-plate; Fig. 10, a plan view of the upper guide and kerf-plate; Fig. 11, a side elevation of the lower guide; Fig. 12, a sectional view of the same on the line 12 12 of Fig. 11; Fig. 13, a side view of the adjustable driving mechanism on an enlarged scale; Fig. 14, a sectional view taken on the line 14 14 of Fig. 4; Fig. 15, a section on line 15 15 of Fig. 3, showing mechanism for the feed-rolls. Fig. 16, Sheet 2, is a sectional view of the oil-box and scraper for the lower pulley, looking from the opposite side of the machine from that shown in Fig. 1.

Similar reference-letters indicate similar parts.

The main frame of the machine does not differ essentially from those now in use and embodies a lower or base portion A, in which is mounted a suitable driving-shaft A', carrying the lower saw-driving pulley $A^2$, said shaft being supported in suitable bearings and having suitable fast and loose pulleys $A^3$ $A^4$. Mounted also upon the shaft A' is a belt-pulley B, around which and a corresponding pulley B' passes a belt $B^2$, said pulley B' having attached to it a driving-disk or face-pulley $B^3$, the flat face of which is adapted to coöperate with the edge of a friction-driven disk C, having projecting from its periphery a narrow edge of leather $c$ or other similar deadening material obtaining the necessary friction, whereby the operation will be rendered much less noisy than where two metal wheels are arranged to coöperate. The manner of holding the ring or strip of leather $c$, which is presented edgewise, is to clamp it against the disk C by means of a ring $C^2$, secured by suitable screws, as shown in Fig. 2ᵇ. This provides a narrow edge for engagement, which is necessary, deadens the sound, and gives a better driving contact.

The pulley C is mounted upon a shaft C', connected by suitable connections (preferably embodying a worm, worm-wheel, and beveled gears, as shown in dotted lines in Fig. 1) with a shaft D, which operates the feed mechanism, consisting of suitable feed-rolls E, arranged on opposite sides of the path traversed by the saw, said feed-rollers being preferably arranged in pairs and supported in adjustable bearings. These rolls are each provided near their upper ends with gears E', meshing with a gear $E^2$ on a central shaft $E^3$, to the lower end of which is connected a coupling-head $E^4$, provided with a suitable socket adapted to receive a ball $E^5$ and with the recesses for the accommodation of studs $E^6$, said ball and studs being arranged upon the upper end of a shaft $E^7$, supported in a suitbale bearing, and having upon its lower end a beveled gear $E^8$, meshing with a corresponding wheel $E^9$, splined to and longitudinally adjustable upon the shaft D. The lower ends of the rolls are also provided with sockets and recesses, in which fit the balls $E^{10}$ and studs $E^{11}$, on the ends of shafts $E^{12}$, supported in the usual adjustable frames. This ball-and-socket connection between the feed-rolls and their driving mechanism and supports is such that the distance between the ends of the rolls may be varied to suit material of slightly different thickness at top and bottom, and by the arrangement shown the operative connection between the parts will be maintained.

Any suitable tension or pressure devices may be provided for allowing the necessary yielding of the rollers and the maintenance of the required pressure on the board, but this forms no part of my present invention.

In order that the board may be prevented from becoming displaced when its end is passing from one pair of feed-rollers to the other, I provide an adjustable guide-plate $D^3$, secured to the frame carrying the feed-rolls and serving to bridge the space between them.

It will be understood that the frames $D^4$ and $D^5$, carrying the feed-rollers, are relatively adjustable by means of the hand-wheels $d^4$ and $d^5$, respectively, or by any other suitable means, as usual in machines of this description.

Operating upon the driving-belt $B^2$, forming the connection between the driving-shaft and the feed devices, is a belt-tightening idler-pulley F, journaled in the end of the lever F', pivoted at $F^2$, and having in its rear end a counterweight $F^3$, the preponderance of weight being on the side of the pulley F, so that as the pulley B', carrying the disk $B^3$, is moved to cause the edge of the disk C to operate nearer to or farther from the center of the disk $B^3$ the tension on the belt will be maintained, as shown in dotted lines in Fig. 13. The lateral adjustment of the disk $B^3$ is accomplished by means of a screw $b^3$, operating in a lug $b^4$ on the main frame, said screw being journaled loosely in the frame $b^5$, carrying the disk and pulley, and which also embodies a vertical shaft $b^6$, connected by beveled gears $b^7$ with the screw $b^3$. The vertical adjustment of the disk and its shaft is accomplished by means of a hand-wheel $b^8$, connected to an adjusting-screw $b^9$.

Mounted upon the main frame at the front of the feed-rolls is a work-supporting roll G, with its upper periphery about level with the bed or work-support G', upon which the board is fed to the saw.

H represents the band-saw of any suitable construction passing around the lower saw-driving pulley $A^2$ and the upper saw-pulley $A^\times$, said upper pulley being arranged upon the arbor J, mounted in suitable boxes J' and $J^2$, the former being provided with a downward extension or stud $j$, entering a socket formed in the outer arm K' of a yoke-frame K, as shown in Fig. 4, said stud projecting substantially in the plane in which the saw moves and being preferably arranged at the center of the arbor carrying the saw-pulley. The boxes $J^2$ are connected and are mounted upon a flange $K^2$, formed on the front of the upper end of the adjustable frame or yoke K and are capable of sliding thereon, being guided in their movements and retained upon the flange $K^2$ by means of suitable bolts $K^3$, as shown in Fig. 5, the connected boxes being provided with a downwardly-extending arm $K^4$, through which passes a screw L, journaled in a bracket formed upon the yoke-frame and prevented from longitudinal motion, said screw being operated by a vertical shaft L', provided with a hand-wheel at its lower end, the connection between said shaft and screw being formed by beveled gears $l$, as shown in Fig. 5. Of course suitable collars are provided for preventing the longitudinal movement of the shaft in its bearings, these being of the ordinary or any suitable construction. It will thus be seen that by operating the hand-wheel on the shaft L' the upper saw-pulley $A^\times$ can be turned horizontally on the projection $j$ as a center, so as to incline its face relative to the face of the lower saw-driving pulley $A^2$. This horizontal adjustment I find in practice is best adapted for regulating the projection of the toothed edge of the saw over the edge of the saw-pulleys. It is much more reliable and is less liable to cause one side of the saw to be stretched than where the tension-pulley is tilted in a vertical plane. The distances between the two pulleys are such that the saw is not twisted an appreciable amount, while a very slight adjustment of the screw L will cause the saw to travel back and forth across the face of the pulleys until the desired position on the pulleys is reached. This adjustment I regard as a valuable feature of my invention irrespective of the other constructions, and while the particular mechanism shown is well adapted for the purpose I do not desire to be confined to this. While it is desirable that the adjustable frame K be in the form of a yoke, in order that both ends of the arbor may be supported, this is not essential.

The yoke or frame K is arranged to slide upon the standard $A^5$, attached to the main or base frame of the machine, which latter is made hollow, as usual, and is provided with the ribs $a$ at the front portion, forming ways upon which the yoke-frame travels vertically, said frame being held from forward movement by flanges or plates $k$, passing to the rear of the ribs or flanges $a$, as shown in Figs. 5, 6, &c. Instead, however, of securing the yoke-frame rigidly to the standard, so as to be capable of only a vertical movement, I pivot said frame by means of a pin M (see Figs. 4 and 14) to a slide M', arranged in a suitable groove in the face of the standard and capable of a vertical movement only. The yoke-frame, it will be seen, is capable of being slightly tilted on this pivot-pin M, and as only a very slight motion is necessary I extend out from the slide a lug $M^2$, through which passes the threaded end of a bolt $M^3$, journaled in the lower portion of the yoke-frame, and having a squared head for the application of a wrench and a sector $m$, with indicating-marks thereon adapted to coöperate with an index $m'$, as shown particularly in Fig. 1, so that the amount of tilting movement imparted to the yoke-frame may be accurately indicated. As the arc in which the lower end of the yoke-frame moves is so flat I do not deem it necessary to make special provision for the relative movements of the screw and lug $M^2$. The movement of the yoke-frame relative to the standard, however, is permitted by the loose connection between the plates $k$ and guides $a$, as clearly shown.

The yoke-frame is held elevated and the saw maintained under tension by means of the usual lever N, pivoted at $n$ to the main frame and connected by a suitable more or less elastic link $N'$ to the weighted lever $N^2$, the connection between said lever N and the yoke-frame being formed by a screw O, passing through a lug $O'$ on the lower end of the yoke-frame and stepped at its lower end on the short arm of the lever N, as shown in Figs. 1 and 4, and secured to the lower end of this screw is an adjusting-wheel provided with a vertically-extending flange provided with notches $O^2$ at intervals, with which is adapted to coöperate the shank of the hand-lever $O^3$, said lever being provided with an eye at its end loosely encircling the lower end of the screw O or a boss formed thereon, so that by lifting the outer end of the lever it may be engaged with any of the notches and the screw turned in either direction to permit the required adjustment. This arrangement prevents the removal of the hand-lever and maintains it in proper position, so that the operator may adjust the screw in either direction quickly, when desired.

I have not deemed it necessary to show the weighted lever $N^2$ in detail, as substantially the same arrangement is common in machines of this character.

In order to prevent the accumulation of resinous sawdust or dirt upon the surface of the saw-pulleys, and also to remove any materials which might tend to accumulate thereon and keep them in the best condition for carrying the saw, I provide each of said pulleys with a scraper adapted to coöperate with its surface, said scraper being preferably formed upon or attached to a receptacle for containing waste or other fibrous material soaked in oil. This oil-box and scraper for the upper pulley are shown in Figs. 4 and 8 and indicated by $H'$, $H^2$ indicating the scraper, consisting of an adjustable plate attached to the side of the oil-box $H'$ and coöperating with the surface of the pulley. The oil-box and scraper for the lower pulley are precisely the same in construction as the upper one and is indicated by $H^4$, and is shown in dotted lines in Fig. 1 and in full lines in Fig. 16, this view being taken from the opposite side of the machine from that shown in Fig. 1. The oil applied to the surface of the pulley by the fibrous material softens any sawdust that may be pressed thereon by the saw and the scraper removes it.

In Fig. $1^a$ is shown a bracket $H^5$, arranged beneath the operating side of the saw H, provided with plates $h'$ $h'$ and adapted to prevent sawdust or small pieces of wood, &c., from passing between the saw and its pulley $A^2$.

Heretofore in band sawing-machines it has been customary to employ back-guides for the saw consisting of one or more small steel rollers loosely journaled in suitable bearings and with which the back of the saw comes in contact when operating upon knots or particularly hard wood; but there are several objections to rollers of this description, for the reason that no provision is made for keeping them in motion, and when the saw is pressed back against them there is considerable friction before the surface of the rollers partakes of the motion of the saw. This tends not only to heat the back of the saw and cause it to crystallize and break, but wears a groove in the roller, and as these grooves are often only part way around and at varying distances from the center they will react upon the saw and wear it unevenly, to say nothing of failing to operate properly as a back-guide. With the object in view of providing a back-guide for the saw which will overcome these objections in the first instance by traveling with the saw and at substantially the same surface speed, and at the same time one in which the wearing-surface is capable of being renewed at very slight cost, I provide the arrangement shown particularly in Figs. 9 to 12, inclusive. This back-guide in the form of a wheel embodies generally a central portion of hard metal, as steel, and two flanges arranged on opposite sides and projecting forward of the bearing portion, so as to be in close proximity to the sides of the saw, said wheel being so loosely mounted in its bearings that the movement of the air caused by the saw will keep the guide-wheel moving, or the sides of the back portion of the saw touching the edges of the flanges will maintain said wheel in motion. In the embodiment of my invention shown herein I construct this wheel as shown particularly in Fig. 12, P indicating the shaft upon which it is mounted supported in suitable bearings formed upon or secured to a suitable bearing-block $P'$, Fig. 11, and the wheel being composed of a sleeve $P^2$, having a disk or flange $P^3$ formed thereon, preferably recessed slightly in its face for the reception of the hard-steel disk P⁴, stamped preferably of sheet-steel and properly trued up, said disk P⁴ being slipped upon the sleeve and held in position by a disk P⁵, which slips over the sleeve P² and is secured in position by set-nuts P⁶, screwing upon the threaded end of the sleeve.

The edges of the disks P³ P⁵ are separated by the steel disk P⁴ a slightly greater distance apart than the thickness of the saw, the back of which is between them, and it will be understood that the movement of the saw will cause the rapid rotation of the wheel, and when the saw is pressed back it will engage the edge of the disk P⁴. When this disk becomes worn, if it should, it can be readily replaced by removing the nuts and disk P⁵ and another disk placed in position. As the saw under normal conditions will only engage with the sides of the disk P³ or P⁵ and this contact is very slight, the air in motion being sufficient to cause the rotation, there will be little or no liability of their being worn or of the saw becoming unduly heated by contact therewith. Though this back-guide is capable of application to other machines than the one herein shown I prefer to employ two of them and to arrange one above and the other below the work-supporting table, the bearings P' of the lower guide being attached to a frame or casting Q, secured to the bed of the machine and bifurcated at its forward end and having recesses in the furcations for the accommodation of the wooden blocks Q', arranged on opposite sides of the saw, and to the upper portion of said frame Q is secured a plate Q², having a lower dividing-blade Q³ thereon adapted to project into the kerf formed by the saw.

The frame P' of the upper back-guide is secured to a plate R, fastened to a frame R', sliding upon a standard R² and vertically adjustable by means of a rack R³, operated upon by a pinion on the end of a shaft R⁴, said sliding frame being counterbalanced by a weight R⁵. Attached to the lower side of the plate R is the upper kerf-guide Q³, corresponding to the lower kerf-guide.

It will be understood that the movable frame R can be adjusted to accommodate material of various heights and that the two kerf-guides being relatively long and not thicker than the saw will steady the material while it is passing through, and this arrangement is particularly advantageous in resawing thin boards, as these guides will steady the end of the board and prevent improper positioning after it has left the feed-rollers.

I claim as my invention—

1. In a band-saw, the combination with the standard having the central guideway, and the guides at the sides, of the slide movable in the central guideway, the pulley-carrying frame pivoted to the slide, and loosely engaging the side guides, and the adjusting-screw connecting the slide and pulley-frame, whereby the slide is rigidly guided on the standard and the frame is held from forward movement on the standard, substantially as described.

2. In a band-saw, the combination with the standard having the guides, the slide thereon, the frame loosely engaging the guides and pivoted to the slide, and adjustable connections between the slide and frame, of the arbor, the pulley thereon, and bearings for said arbor adjustable on the frame to swing in a plane at right angles to the plane on which said frame swings on the slide, substantially as described.

3. In a band-saw, the combination with the standard, the slide movable thereon in rigid guides, the yoke-frame loosely engaging the guides and pivoted to the slide, and adjustable connections between the slide and yoke-frame, of the arbor and the pulley thereon, the bearings for the arbor, one pivoted to and the other sliding upon the yoke-frame, and adjusting devices between the yoke-frame and the bearing for the arbor for moving the arbor-bearing on its pivot, substantially as described.

4. In a band sawing-machine, the combination with the standard, the slide movable thereon in rigid guides, the yoke-frame loosely engaging the guides and pivoted to the slide, and the adjusting-screw between the yoke-frame and slide, of the arbor, the pulley thereon, the two bearings for the arbor, one pivoted to the yoke and the other sliding thereon and the adjusting-screw adjusting the sliding arbor-bearing relative to the yoke-frame, substantially as described.

5. In a sawing-machine, the combination with the main frame, a work-support, feeding devices and a saw, of a back-guide roller beneath the work-support, an upwardly-projecting kerf-plate above said roller, a vertically-adjustable frame above the work-support and back of the saw, and a back-guide roller and a downwardly-projecting kerf-plate thereon, substantially as described.

6. In a sawing-machine, the combination with the main frame, a work-support, feeding devices and a saw, of an upwardly-projecting thin kerf-plate projecting upwardly in line with the saw, and an adjustable frame above the work-support having the downwardly-projecting thin kerf-plate in line with the saw, substantially as described.

7. In a sawing-machine, the combination with the feed devices, a shaft for operating them, the driven disk thereon having an operating edge, of a driving-belt pulley, a pulley and a driving-disk connected thereto and arranged with its face engaging the periphery of the driven disk, an adjustable frame carrying the driving-disk and its pulley, a belt connecting the driving-belt pulley and the pulley carrying the driving-disk, and a belt-tightener operating on said belt, substantially as described.

8. In a sawing-machine, the combination with the main frame, the vertical feed-rolls having the gears near their upper ends, and the universal joint connection at their lower ends, of the vertical driving-shaft arranged between the rolls, having the gear meshing with the gears on the feed-rolls, and the universal joint connection intermediate its driven portion and the gear, said connection being substantially in the plane of the universal connection at the lower end of the feed-rolls, substantially as described.

JOHN CONNELL.

Witnesses:
F. F. CHURCH,
G. A. RODA.